United States Patent [19]

Jeon

[11] Patent Number: 5,825,900
[45] Date of Patent: Oct. 20, 1998

[54] LOUDSPEAKER HOUSING FOR VIDEO DISPLAY APPLIANCE

[75] Inventor: Chang Wook Jeon, Kyoungsangbuk-Do, Rep. of Korea

[73] Assignee: LG Electronics Inc., Rep. of Korea

[21] Appl. No.: 978,401

[22] Filed: Nov. 25, 1997

[30] Foreign Application Priority Data

Nov. 27, 1996 [KR] Rep. of Korea ................... 1996-58266

[51] Int. Cl.⁶ .................................................. H04R 25/00
[52] U.S. Cl. ........................... 381/154; 381/156; 381/159; 181/152
[58] Field of Search .................................. 381/24, 88, 90, 381/154, 156, 159, 188, 205; 181/152, 156, 159, 160, 192, 198, 199

[56] References Cited

U.S. PATENT DOCUMENTS 5,513,270  4/1996  Lewis ........................................ 381/159
5,524,062  6/1996  Oh ............................................... 381/24
5,604,337  2/1997  Sugimoto et al. ....................... 381/156

*Primary Examiner*—Huyen Le
*Attorney, Agent, or Firm*—Oppenheimer Wolff & Donnelly

[57] ABSTRACT

A loudspeaker housing for a video display appliance including a front housing to which a loudspeaker is engaged and a rear housing is disclosed. According to the present invention, the front housing has a main channel and a pair of subsidiary channels, the main channel being coupled with a loudspeaker. The rear housing has a pair of ducts for collecting sounds produced rearwardly from the loudspeaker and guiding the sounds to the subsidiary channels of the front housing. Each one end of the ducts is inserted into the respective subsidiary channel of the front housing, and each of the other ends is positioned within the rear housing, with the other ends being opened. And, the subsidiary channel of the front housing and the respective duct form an acoustic horn so that sound produced rearwardly from the loudspeaker is resonated at special frequency.

5 Claims, 2 Drawing Sheets

LOUDSPEAKER HOUSING FOR VIDEO DISPLAY APPLIANCE

BACKGROUND OF THE INVENTION

1. Field of the Invention

The present invention relates generally to a loudspeaker housing for a video display appliance such as a television receiver, a computer monitor, etc., and more particularly to a loudspeaker housing capable of reducing the limit of the bass register of the sound further than the minimal resonant frequency of the loudspeaker itself.

2. Description of the Related Art

In a conventional video display appliance, a cabinet incorporates a cathode-ray tube and speaker boxes each thereof housing a speaker. The cathode-ray tube is disposed in the center of the cabinet, and the speaker boxes are disposed on either side of the neck, base or rear portion of the cathode-ray tube. Each speaker communicates with the front sound outlet of the cabinet via a channel forming an acoustic path.

In such a cabinet, the quality of the sound deteriorates because of the effect of the relatively long, narrow, and tortuous channels defining the acoustic paths. These acoustic paths give rise to a peculiar and unsatisfactory frequency response of the sound waves respectively passing through them. In particular, the quality of the sound with low frequency produced from the loudspeaker is considerably deteriorated by the interference of high frequency and mid frequency passing through the acoustic path.

In order to reproduce the bass register sound, the conventional video display appliance must have a woofer speaker and a tweeter speaker, instead of a single speaker unit. In this case, there is the problem that acoustic paths for the woofer and tweeter speakers are separately provided.

SUMMARY OF THE INVENTION

In order to solve the above problems, an object of the present invention is to provide a loudspeaker housing for a video display appliance capable of reproducing a bass register sound by separating the sound produced from the single loudspeaker into the upper and bass register sounds (high frequency and low frequency sounds), without using a special woofer speaker.

The present invention uses the function of reducing the limit of the bass register of the sound below the minimal resonant frequency of the loudspeaker itself, due to the influence of the compliance of the air existing within a housing. Also, the present invention uses the principle of further lowering the limit of the bass register of the sound by providing the inside of the loudspeaker housing with a duct being used as a resonant system. Because the phase of the sound wave radiated into the loudspeaker housing from the loudspeaker is turned over by the resonance of the air particles, and then its phase will be the same as that of the sound waves of the front of the loudspeaker, the sound waves in bass register are reinforced, and thus the limit of the bass register can be lowered.

In order to achieve the above object, there is provided a loudspeaker housing for a video display appliance comprising: a front housing and a rear housing, wherein the front housing has a main channel and at least two subsidiary channels for guiding sounds produced forwardly and rearwardly from a loudspeaker, the main channel being coupled to the loudspeaker; the rear housing has at least two ducts for collecting the sounds produced rearwardly from the loudspeaker and guiding the sounds to the subsidiary channels of the front housing; and each first end of the ducts is coupled to the respective channel of the front housing, and a second end of one duct is positioned within the rear housing and faces a second end of the other duct.

Preferably, a sound absorption material is interposed between the front housing and the rear housing, the front housing and the loudspeaker, and the front housing and the first ends of the ducts, respectively.

The subsidiary channel of the front housing and the respective duct form an acoustic horn so that the sound produced rearwardly from the loudspeaker is resonated at special frequency, and cross sectional area or length of the acoustic horn can be adjusted.

According to another aspect of the present invention, there is provided a loudspeaker housing for a video display appliance comprising: a front housing and a rear housing, a loudspeaker engaged to the front housing, wherein the front housing has a main channel and a pair of subsidiary channels, the main channel being coupled with a loudspeaker; the rear housing has a pair of ducts for collecting sounds produced rearwardly from the loudspeaker and guiding the sounds to the subsidiary channels of the front housing; each one end of the ducts is inserted the respective subsidiary channel of the front housing, and each of the other end is positioned within the rear housing, with the end being opened; and the subsidiary channel of the front housing and the respective duct form an acoustic horn so that sound produced rearwardly from the loudspeaker is resonated at special frequency.

With the construction as described above, the loudspeaker housing according to the present invention can reproduce the desired low frequency sound by providing the acoustic horn within the housing, without using a special woofer speaker.

BRIEF DESCRIPTION OF THE DRAWINGS

The above object, other aspects, and advantages of the invention will become apparent by describing the preferred embodiments thereof with reference to the accompanying drawings, in which.

DETAILED DESCRIPTION OF THE PREFERRED EMBODIMENT

Figure 1:
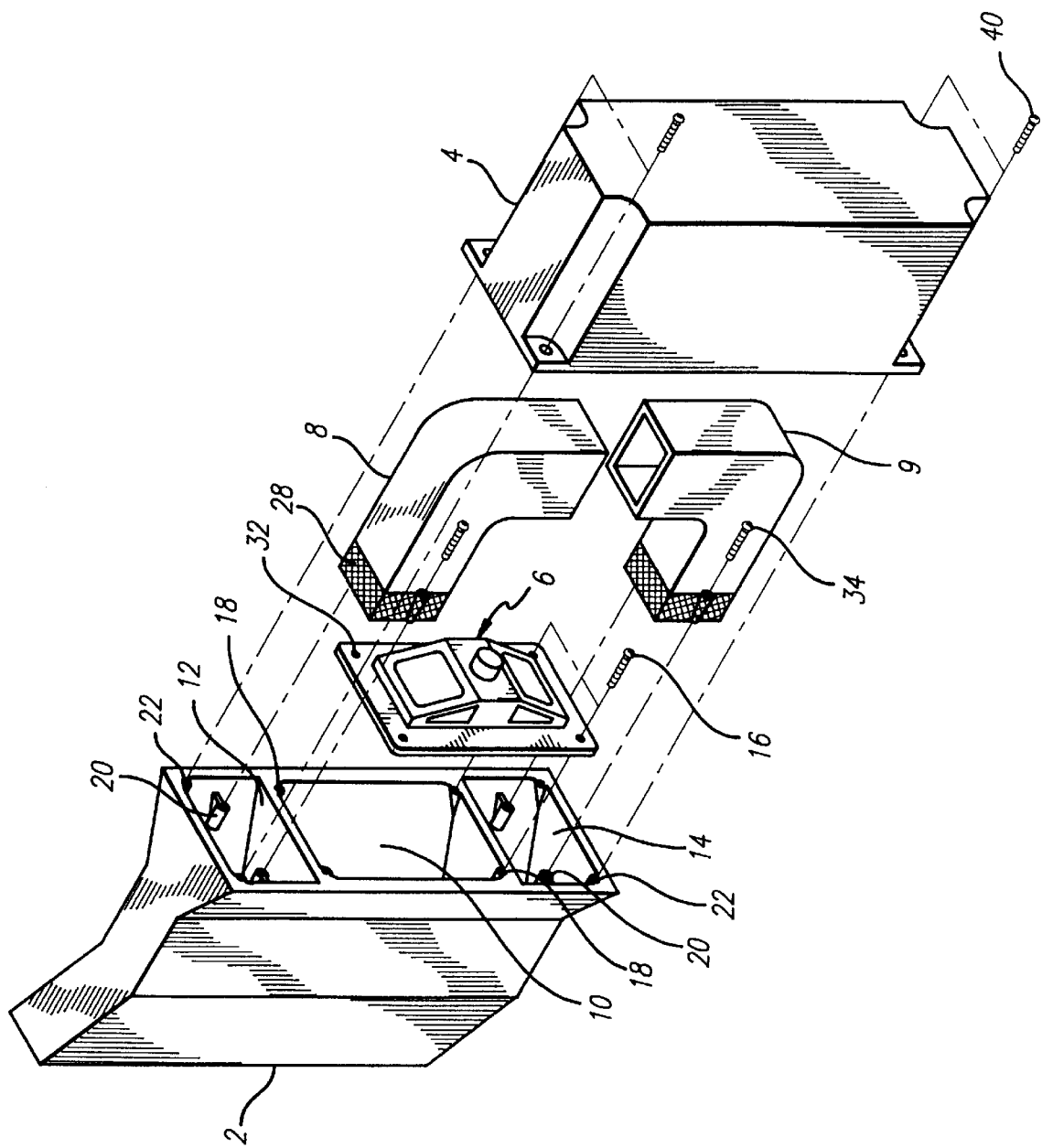
FIG. 1 is an exploded perspective view illustrating the structure of a loudspeaker housing according to the present invention.
Figure 2:
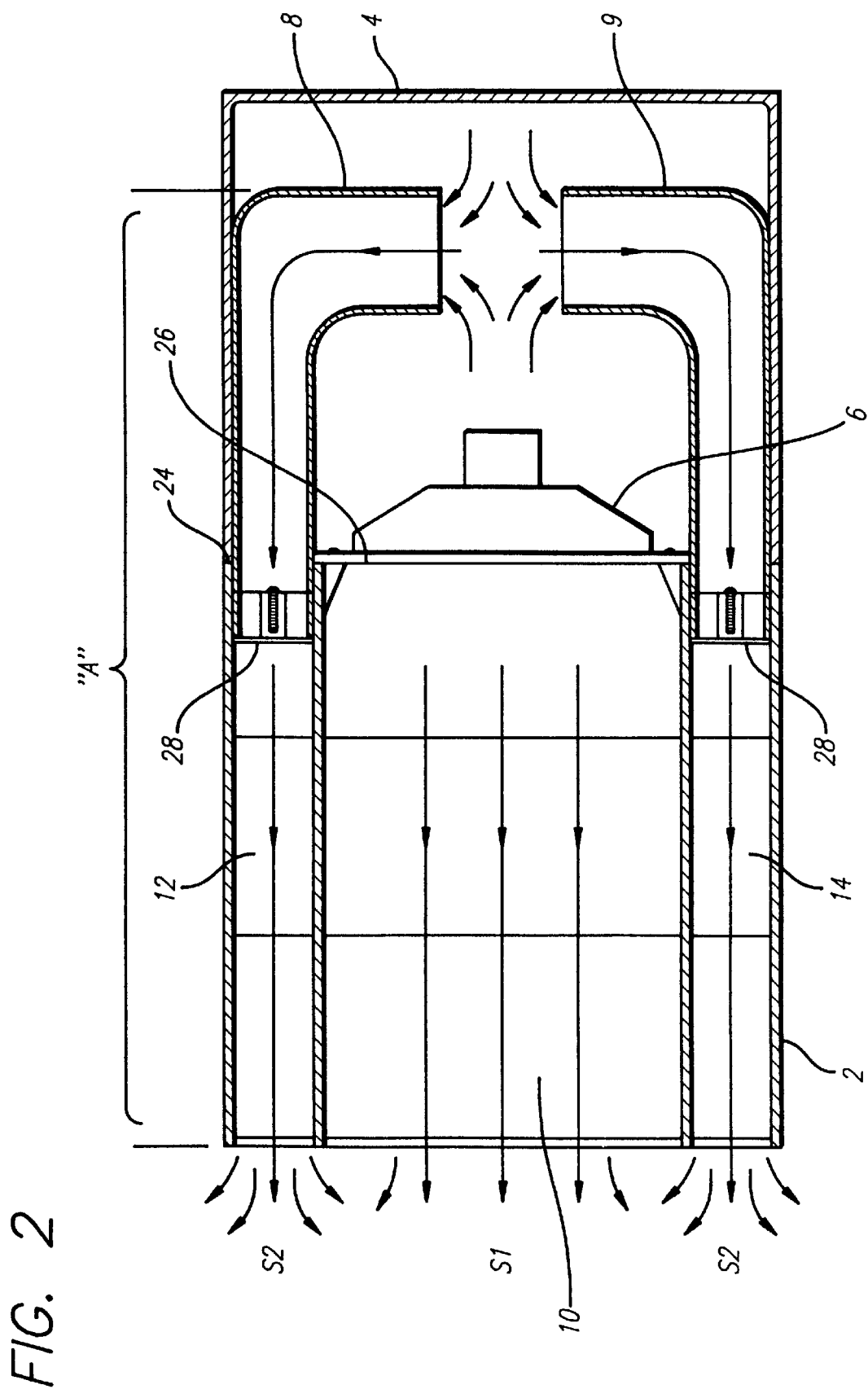
FIG. 2 is a cross sectional view illustrating the engaging state of the loudspeaker housing shown in FIG. 1.

The loudspeaker housing according to the present invention comprises, as shown in FIGS. 1 and 2, a front housing having three channels 10, 12 and 14 for guiding the sound outwardly, to which a loudspeaker 6 is fixed, a pair of ducts 8 and 9 connected to the back of the front housing 2, and a rear housing 4 connected to the front housing 2 for enclosing the loudspeaker 6 and the ducts 8 and 9.

The channels 10, 12 and 14 of the front housing 2 are formed in such a shape that both ends thereof are opened, the main channel 10 positioned at the center of the other channels guides the sound produced forwardly from the loudspeaker 6, and the subsidiary channels 12 and 14 positioned at either side of the main channel 10 guide the sound produced backwardly from the loudspeaker 6.

Further, the front housing 2 includes speaker fixing bosses 18 for securing the loudspeaker 6 to the back thereof using screws 16, duct fixing bosses 20 for securing the ducts 8 and 9 to the upper and lower portions, and rear housing fixing bosses 22 for securing the rear housing to the back thereof. As shown in FIG. 2, a resilient gasket 24 is provided between the front housing 2 and the rear housing 4 to maintain the air-tight condition. The opening of the main channel 10 to which the loudspeaker 6 is secured is also provided with a sound absorption material 26 to prevent the sound produced forwardly from the loudspeaker 6 from leaking. In additional, the ends of the ducts 8 and 9 fitted into the subsidiary channel 12 and 14 are attached with a meshed plate 28.

The loudspeaker housing with the arrangement as described above will be assembled as follows.

First, after the loudspeaker 6 is positioned on the back of the main channel 10 of the front housing 2, the loudspeaker fixing bosses 18 are engaged with the screws 16 through fixing holes 32 formed on the flange of the loudspeaker 6 to engage the loudspeaker 6 to the front housing 2.

When the engagement of the loudspeaker 6 to the back of the front housing 2 is completed, the ducts 8 and 9 are oppositely coupled to the upper and lower portions of the loudspeaker 6 so that the sound produced rearwardly from the loudspeaker 6 is forwardly outputted through the front housing 2.

As described above, the upper and lower portions of the front housing 2 engaged with the loudspeaker 6 are formed with duct fixing bosses 20 to engage with the ducts 8 and 9. After the ends of the ducts 8 and 9 are positioned on the subsidiary channels 12 and 14, the screws 34 are threaded into the duct fixing bosses 20 formed on the front housing 2 via the holes 36 formed on the protrusion of the ducts 8 and 9.

The ducts 8 and 9 secured to the back of the front housing 2 are bent at right angle, respectively, and are oppositely positioned on the back of the loudspeaker 6.

With the arrangement, since the ducts 8 and 9 positioned oppositely on the back of the loudspeaker 6 have a hollow body, the sounds produced rearwardly from the loudspeaker 6 are guided to the subsidiary channels 12 and 14 through the ducts 8 and 9.

Meanwhile, since the ends of the ducts 8 and 9 positioned on the subsidiary channels 12 and 14 of the front housing 2 are attached with the meshed plates 28, when the sounds produced rearwardly from the loudspeaker are outputted through the subsidiary channels 12 and 14, the leakage of sounds to the back of the front housing 2 are prevented.

In turn, after the back of the front housing 2 is engaged with the loudspeaker 6 and the ducts 8 and 9 by means of the screws, the back of the front housing 2 is closely fixed with the rear housing 4 by screws 40 in order to protect the loudspeaker 6 and the ducts 8 and 9, and to output the sound produced rearwardly from the loudspeaker 6 through the ducts 8 and 9.

According to the loudspeaker housing with the above construction, the air within the rear housing 4 and the air within the ducts and the channel, i.e., so-called acoustic horn A defined by the front of the subsidiary channels 12 and 14 of the front housing 2 to the ducts 8 and 9 are resonated in special frequency by the resonant of Helmholtz. Because the sound S1 radiated forwardly from the loudspeaker and the sound S2 radiated rearwardly from the loudspeaker have same phase at frequency higher than a half resonant frequency, the half resonant frequency can be expressed as follow:

$$f_2 = \frac{1}{2\pi} \times \sqrt{\frac{S_C}{M_P}}$$

wherein, $M_P$ is the mass of the air within the acoustic horn, and $S_C$ is the stiffness of the air within the rear housing. The stiffness of the air is defined by $1.4 \times 10^7 \times (a^4/V)$, in which a is an effective diameter, and V is an interior volume of the rear housing.

With the above expression, under the condition that the stiffness of the air is constant, since the mass of the air within the acoustic horn A and the half resonant frequency $f_2$ are in inverse proportion to each other, the mass of the air within the acoustic horn have to be adjusted to raise or lower the half resonant frequency. This can be achieved by adjusting the cross sectional area or length of the acoustic horn A.

On completion of the assemblage of the loudspeaker housing, in order to adjust the cross sectional area or length of the subsidiary channels 8 and 9 formed on the upper and lower sides of the front housing 2, the special ducts 8 and 9 are oppositely secured to the back of the front housing 2. Since the desired half resonant frequency can be obtained by adjusting the cross sectional area or length of the acoustic horn A of the loudspeaker housing, a desired sound can be produced when the sound is outputted via the loudspeaker housing.

While the present invention has been described and illustrated herein with reference to the preferred embodiment thereof, it will be understood by those skilled in the art that various changes in form and details may be made therein without departing front the spirit and scope of the invention.

What is claimed is:

1. A loudspeaker housing for a video display appliance comprising:

a front housing and a rear housing, wherein the front housing has a main channel and at least two subsidiary channels for guiding sounds produced forwardly and rearwardly from a loudspeaker, the main channel being coupled to the loudspeaker;

the rear housing has at least two ducts for collecting the sounds produced rearwardly from the loudspeaker and guiding the sounds to the subsidiary channels of the front housing; and each first end of the ducts is coupled to the respective subsidiary channel of the front housing, and each second end of the ducts is positioned within the rear housing and faces a second end of the other duct.

2. The loudspeaker housing as claimed in claim 1, wherein a sound absorption material is interposed between the front housing and the rear housing, the front housing and the loudspeaker, and the front housing and the first ends of the ducts, respectively.

3. The loudspeaker housing as claimed in claim 1, wherein the subsidiary channel of the front housing and the respective duct form an acoustic horn so that the sound produced rearwardly from the loudspeaker is resonated at special frequency, and cross sectional area or length of the acoustic horn can be adjusted.

4. A loudspeaker housing for a video display appliance comprising:

a front housing and a rear housing, a loudspeaker engaged to the front housing, wherein the front housing has a main channel and a pair of subsidiary channels, the main channel being coupled with a loudspeaker;

the rear housing has a pair of ducts for collecting sounds produced rearwardly from the loudspeaker and guiding the sounds to the subsidiary channels of the front housing;

each one end of the ducts is inserted into the respective subsidiary channel of the front housing, and each of the other ends is positioned within the rear housing, with the other ends being opened; and the subsidiary channel of the front housing and the respective duct form an acoustic horn so that sound produced rearwardly from the loudspeaker is resonated at special frequency.

5. The loudspeaker housing as claimed in claim 4, wherein cross sectional area or length of the acoustic horn can be adjusted.

\* \* \* \* \*